2,894,992
Patented July 14, 1959

2,894,992
ARYL NITRO ETHERS

Edward B. Hodge, Terre Haute, Ind., assignor to Commercial Solvents Corporation, Terre Haute, Ind., a corporation of Maryland No Drawing. Application August 19, 1957
Serial No. 679,111

9 Claims. (Cl. 260—611)

My invention relates to bacteriostatically active aryl nitro ethers and more particularly to novel nitro ethers having the following structural formula

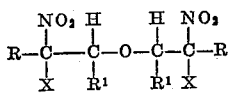

where R is alkyl, $R^1$ is selected from the group consisting of aryl and substituted aryl; and X is hydrogen or halogen.

This is a continuation-in-part of my copending application Serial No. 630,084, filed December 24, 1956, and now abandoned.

The method of preparing aryl nitro ethers generally used in the industry is described in U.S. Patent 2,562,151 which consists essentially of forming an aqueous mixture of an alkali base and a primary alcohol, adding an aryl nitroolefin to form an alkali salt of a nitro ether, and halogenating the mixture to produce the haloaryl nitro ether. Only unsymmetrical halogenated aryl nitro ethers can be prepared using this procedure; a fact which greatly handicaps the industry in its search for better insecticides and pharmaceuticals.

I have discovered that symmetrical aryl nitro ethers can be formed with ease by the process of my invention which consists essentially of reacting an aryl nitroolefin in a reaction mixture of an alkali base and a N,N-dialkyl lower aliphatic amide, hydrolyzing the alkali salt of the nitro ether, and separating the desired nitro ether from the reaction mixture. If a halogenated ether is desired, the alkali salt may be halogenated by means known to the art.

The aryl nitroolefins which I employ have the structural formula

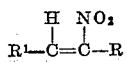

where $R^1$ is aryl and R is alkyl. Typical aryl nitroolefins which can be used in my process include 2-nitro-1-phenyl-1-propene, 2-nitro-1-phenyl-1-butene, 2-nitro-1-(p-chlorophenyl)-1-butene, 2-nitro-1-(p-bromophenyl)-1-butene, 2-nitro-1-p-tolyl-1-butene, 2-nitro-1-phenyl-1-hexene, and 2-nitro-1-(2,4-dichlorophenyl)-1-propene. N,N-dialkyl lower aliphatic amides which can be used as solvents in the production of my nitro ethers include amides, such as N,N-dimethylformamide, N,N-dimethylacetamide, N,N-dimethylpropionamide, N,N-diethylacetamide, N,N-dipropylformamide, etc. Any alkali or alkaline earth metal base may be used in my process; however, I prefer to use potassium or sodium hydroxide.

According to the process of my invention, an alkali base is reacted with an aryl nitroolefin, in the presence of a dialkyl aliphatic amide. I prefer to mix the alkali base with the dialkyl aliphatic amide at room temperature and then to slowly introduce any desired aryl nitroolefin into the reaction mixture to form an alkali salt of a symmetrical nitro ether. In producing my new compounds, it is sometimes necessary to heat the solution with constant agitation in order to dissolve the nitroolefin in the solvent. Similarly, the nitroolefin can be dissolved in some instances if it is added in small amounts with constant agitation.

Following production of the alkali salt of the symmetrical nitro ether, I then treat the salt with a weak acid in order to obtain the desired aryl nitro ether. Suitable acids include dilute solutions of non-oxidizing mineral acids or weak organic acids such as acetic acid. The aryl nitro ether obtained upon hydrolysis is insoluble in the solvents employed and consequently precipitates and is easily recovered.

If a symmetrical dihalo aryl nitro ether is desired, the alkali salt of the aryl nitro ether can be halogenated by use of agents suitable for halogenation of aliphatic hydrocarbons providing such agents are not adversely affected by nitro groups. I prefer to halogenate the alkali salts of the aryl nitro ethers of my invention by the introduction of free halogen into the reaction mixture resulting from reaction of the alkali base with the aryl nitroolefin.

The proportions of the reactants used are not critical; excellent results are obtained with equimolar amounts of the reactants. The process of my invention can be carried out at any temperature within the range from 0 to 70° C.; however, I prefer to carry out the process at a temperature of about 20–30° C.

The following specific examples will further illustrate my invention, but it is not intended that my invention be limited to the specific amounts, procedures or proportions set forth therein.

EXAMPLE I

Into a mixture of 8.5 grams of sodium hydroxide (0.21 mole) and 100 mls. of dimethylacetamide, 19.7 grams of 2-nitro-1-(p-chlorophenyl)-1-propene (0.1 mole) was incrementally introduced with constant stirring. After the olefin was completely stirred into the solution, the reaction mixture was acidified with acetic acid to precipitate white crystalline bis[2-nitro-1-(p-chlorophenyl)propyl]ether. After recrystallization from cyclohexane and benzene, 3.3 grams of bis[2-nitro-1-(p-chlorophenyl)-propyl]ether was recovered having a melting point of 171–173° C.

EXAMPLE II

Into a mixture of 200 mls. of dimethylformamide and 8.5 grams (0.21 mole) of sodium hydroxide in 50 mls. of water, 39.6 grams (0.2 mole) of 2-nitro-1-(p-chlorophenyl)-1-propene were incrementally introduced with constant agitation. After complete solution of the 2-nitro-1-(p-chlorophenyl)-1-propene, an equivalent amount of chlorine was slowly added to form white crystalline bis[2 - nitro - 2 - chloro-1-(p-chlorophenyl)propyl]ether which slowly precipitated as chlorine was bubbled through the solution. After recrystallization from cyclohexane and benzene, 4 grams of product were obtained having a melting point of 177–181° C.

EXAMPLE III

To 200 mls. of dimethylformamide was added 32.6 grams of 2-nitro-1-phenyl-1-propene and 9 grams of sodium hydroxide in 50 mls. of water. To this reaction mixture, 10 mls. of bromine were added dropwise at 20° C. forming a two-layer mixture. From the lower layer, white crystalline bis(2-nitro-2-bromo-1-phenylpropyl)ether slowly precipitated. On recrystallization from ethyl alcohol, 8.6 grams of product was obtained having a melting point of 148–149° C.

EXAMPLE IV

Utilizing the procedures of the above examples, the following ethers were prepared using the indicated reactants.

Table 1

| Halogen | Solvent | Base | Olefin | Product |
|---|---|---|---|---|
| Chlorine | N,N-dimethyl-propionamide | Potassium Hydroxide | 2-Nitro-1-(2,4-Dichloro-phenyl)-1-propene. | Bis-[2-Nitro-1-(2,4-dichlorophenyl)-propyl] ether. |
|  | N,N-dimethyl-formamide | Barium Hydroxide | 2-Nitro-1-phenyl-1-butene | Bis-(2-nitro-1-phenylbutyl) ether. |
|  | N,N-Dimethyl-acetamide | Sodium Hydroxide | 2-Nitro-1-p-tolyl-1-propene | Bis-(2-nitro-1-p-tolylpropyl) ether. |
|  | N,N-Diethyl-acetamide | do | 2-Nitro-1-phenyl-1-hexene | Bis-(2-nitro-1-phenylhexyl) ether. |
|  | do | do | 2-Nitro-1-phenyl-1-butene | Bis-(2-nitro-2-chloro-1-phenylbutyl)-ether. |

EXAMPLE V

The bacteriostatic activity of my new compounds was determined in vitro by the following test. Stock solutions of my novel aryl nitro ethers in acetone were prepared containing 10,000 mcg./ml. These stock solutions were then diluted to desired test concentrations using distilled water and North Gelatin Agar (Difco). The pH of the diluted solutions was adjusted to 7.3. A series of slants of the same medium were prepared and streaked with a representative series of microorganisms. Results were recorded after 24 hours' incubation at 37° C. Growth of the organisms on control plates reached a maximum, for recording purposes, at this time.

The following table discloses the amounts of two representative ethers required to achieve partial and complete bacteriostasis.

|  | Minimal Inhib. Conc., μg./ml. | | | |
|---|---|---|---|---|
|  | Bis(2-bromo-2-nitro-1-phenylpropyl) ether | | Bis[2-bromo-2-nitro-1-(p-chlorophenyl) propyl] ether | |
|  | Partial | Complete | Partial | Complete |
| 150.21 *Micrococcus pyogenes* var. *aureus* | 750 | 1,500 | 750 | 1,000 |
| 160.11 *Streptococcus faecalis* | 750 | 1,500 | 500 | 1,000 |
| 160.22 *Streptococcus hemolyticus* | 750 | 1,500 | 500 | 1,000 |
| 225.11 *Escherichia coli* | 1,500 | 1,500 | 750 | 1,500 |
| 245.31 *Pasteurella pseudotuberculosis* | 500 | 1,000 | 250 | 1,000 |
| 270.11 *Shigella dysenteriae* | 1,500 | 1,500 | 750 | 1,500 |
| 800.21 *Mycobacterium ranae* | 1,500 | 1,500 | 250 | 750 |

Now having described my invention, what I claim is:

1. A compound having the structural formula:

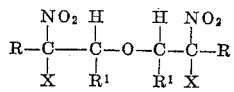

where R is lower alkyl, $R^1$ is a radical selected from the group consisting of phenyl, lower alkyl substituted phenyl, and halogen substituted phenyl, and X is a radical selected from the group consisting of hydrogen and halogen.

2. Bis(2-nitro-1-phenylpropyl) ether.
3. Bis(2-nitro-2-chloro-1-phenylpropyl) ether.
4. Bis(2-nitro-2-bromo-1-phenylpropyl) ether.
5. Bis[2-nitro-2-chloro-1-(p-chlorophenyl)-propyl] ether.
6. Bis[2-nitro-2-chloro-1-(2,5-dichlorophenyl)-propyl] ether.
7. A process for the production of compounds having the structural formula:

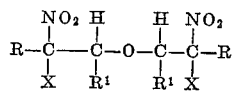

wherein X is hydrogen; R is lower alkyl and $R^1$ is selected from the group consisting of phenyl, lower alkyl substituted phenyl, and halogen substituted phenyl, which comprises reacting an olefin having the structural formula:

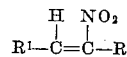

where R and $R^1$ have the same meaning as above, with an alkali base in the presence of a N,N-dialkyl alkylamide, and subjecting the reaction product to acid treatment to obtain an aryl nitro ether.

8. A process for the production of compounds having the structural formula:

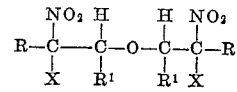

wherein X is halogen, R is lower alkyl and $R^1$ is a radical selected from the group consisting of phenyl, lower alkyl substituted phenyl, and halogen substituted phenyl, which comprises reacting an olefin having the structural formula:

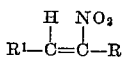

where R and $R^1$ have the meaning given above, with an alkali base in the presence of a N,N-dialkyl alkylamide, and halogenating the reaction mixture.

9. The process of claim 8 in which the halogenating agent is a molecular halogen.

References Cited in the file of this patent

UNITED STATES PATENTS

| 2,485,988 | Senkus | Oct. 25, 1949 |
| 2,562,151 | Senkus | July 24, 1951 |